United States Patent [19]

Gifford

[11] Patent Number: 5,156,423
[45] Date of Patent: Oct. 20, 1992

[54] TUBE RETAINER ASSEMBLY HAVING A SERPENTINE ELASTIC SLEEVE

[75] Inventor: Charles A. Gifford, Osseo, Mich.

[73] Assignee: Dana Corporation, Toledo, Ohio

[21] Appl. No.: 712,023

[22] Filed: Jun. 7, 1991

[51] Int. Cl.$^5$ ............................................. F16L 21/06
[52] U.S. Cl. ................................. 285/322; 285/113; 285/339
[58] Field of Search ................. 285/322, 113, 382.7, 285/342, 323, 307, 339, 314

[56] References Cited

U.S. PATENT DOCUMENTS

| | | |
|---|---|---|
| 2,300,464 | 11/1942 | Parker . |
| 3,501,177 | 3/1970 | Jacobs ................... 285/322 |
| 3,653,689 | 4/1972 | Sapy et al. ............ 285/322 |
| 3,685,860 | 8/1972 | Schmidt . |
| 3,743,326 | 7/1973 | Courtot et al. ........ 285/113 |
| 3,884,513 | 5/1975 | Gassert . |
| 3,918,679 | 11/1975 | Silvana . |
| 3,957,293 | 5/1976 | Rodgers . |
| 4,005,883 | 2/1977 | Guest . |
| 4,032,177 | 6/1977 | Anderson . |
| 4,040,651 | 8/1977 | La Branche ........... 285/113 |
| 4,049,297 | 9/1977 | Reneau ................. 285/322 |
| 4,068,866 | 1/1978 | Saha . |
| 4,068,867 | 1/1978 | Rodgers et al. . |
| 4,188,051 | 2/1980 | Burge . |
| 4,220,359 | 9/1980 | Evenson et al. . |
| 4,229,025 | 10/1980 | Volgstadt et al. . |
| 4,257,629 | 3/1981 | Maple et al. . |
| 4,431,216 | 2/1984 | Legris . |
| 4,463,974 | 8/1984 | Ergun . |
| 4,685,706 | 8/1987 | Kowal et al. . |
| 4,712,811 | 12/1987 | Wier . |
| 4,712,813 | 12/1987 | Passerell et al. . |
| 4,799,717 | 1/1989 | Kingsford ............ 285/382.7 |
| 4,867,484 | 9/1989 | Guest . |
| 4,878,697 | 11/1989 | Henry . |
| 4,932,689 | 6/1990 | Bradley . |

FOREIGN PATENT DOCUMENTS 7705253 11/1977 Netherlands .................. 285/323

Primary Examiner—Eric K. Nicholson
Attorney, Agent, or Firm—Dykema Gossett

[57] ABSTRACT

An improved tube retaining system is disclosed in which a connector member has a generally conical inner bore which receives a first tube. A generally serpentine sleeve is disposed in the conical bore and contacts both an outer periphery of the first tube and the inner periphery of the bore. The unique configuration of the sleeve ensure that the tube is both easily inserted and securely retained against removal within the connector.

11 Claims, 2 Drawing Sheets

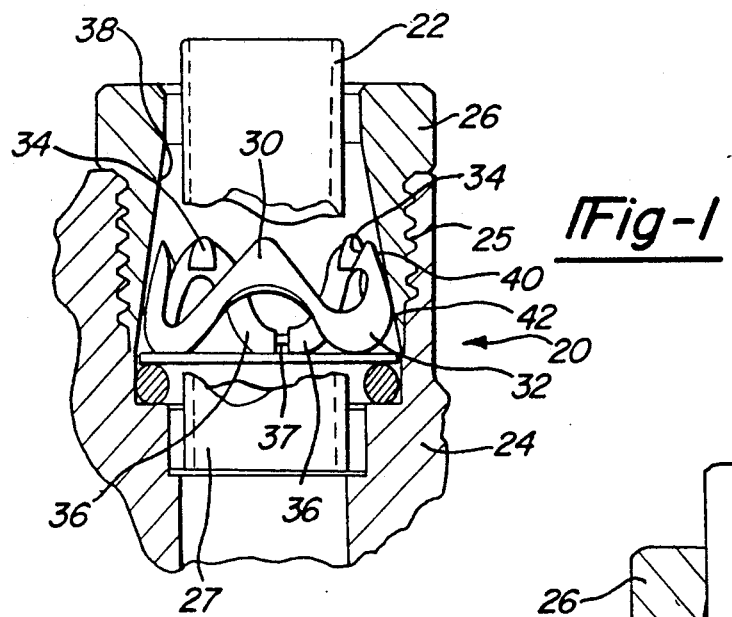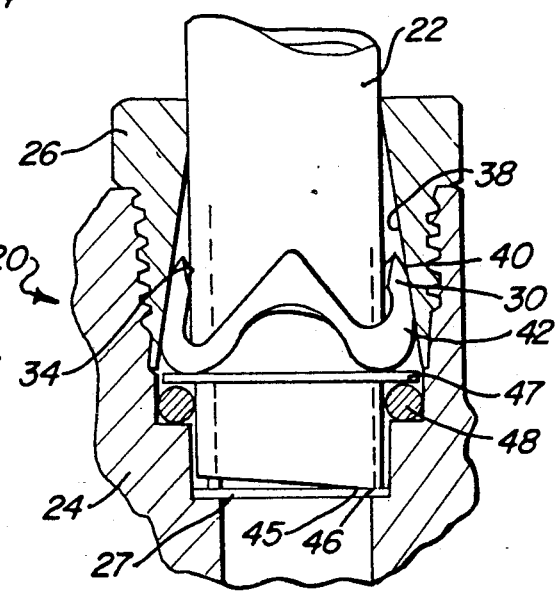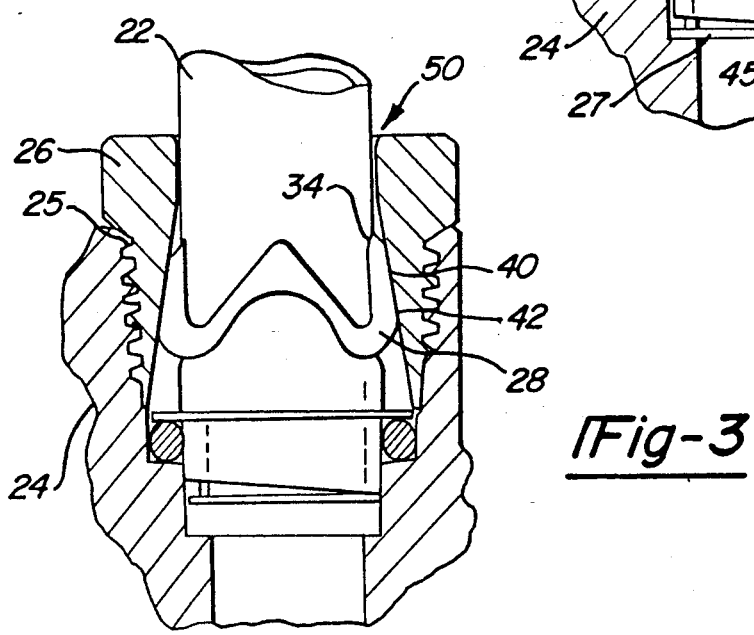

TUBE RETAINER ASSEMBLY HAVING A SERPENTINE ELASTIC SLEEVE

BACKGROUND OF THE INVENTION

The present invention relates to an assembly to retain tubing within a connector.

Several types of tubing retainer assemblies are known in the prior art. These assemblies may be formed of numerous parts, and thus may be difficult to assemble, use, and to manufacture.

There are prior art assemblies which are relatively easy to assemble. One such assembly comprises a connector member receiving a tube at an inner periphery, with a sleeve received between the tube and the inner periphery of the connector member. The connector member has a conical inner bore, and the sleeve has a conical outer periphery. The conical bore constricts the conical sleeve and the sleeve inner periphery grips the tube to retain the tube within the connector member. While such assemblies are less complex than the prior art discussed above, there are still some deficiencies with these assemblies. This type of assembly may present undesirable resistance to insertion of a tube into the sleeve. Further, it would be desirable to develop a retainer assembly that provides a surer grip than these prior art sleeves.

SUMMARY OF THE INVENTION

In the disclosed retainer assembly, a first tube is secured within a connector member without the use of any tools. A second tube would already have been secured to the connector member, and the two tubes are thus connected by the connector member. The first tube extends into a conically tapered bore defined within the connector member. An elastic serpentine sleeve is received within the conically tapered bore and contacts both an outer periphery of the first tube and the inner periphery of the bore. The thin serpentine sleeve is defined by a plurality of undulating curved surfaces which face in alternating directions. A first group of curved surfaces positioned adjacent the first tube face toward the second tube, while alternating curved surfaces positioned adjacent the second tube face the first tube. The curved surfaces adjacent the first tube form an outer peripheral portion of the sleeve which is defined as a first end portion, while the curved surfaces adjacent the second tube form an outer peripheral portion defined as a second end portion. The second end portion is of a diameter greater than the first end portion. Thus, the outer periphery of the sleeve is approximately conical, and expands radially outwardly at an angle approximately equal to the angle of the conically tapered bore of the connector member.

When the sleeve is positioned in a relaxed position in the bore, the inner diameter at the first end portion is less than the outer diameter of the first tube. The first tube is forced into the first end portion of the sleeve and biases the curved surfaces forming the first end radially outwardly until they contact the conically tapered bore. The sleeve is elastic, and tends to be biased back towards the relaxed position. Thus, the curved surfaces defining the first end portion are biased into the outer periphery of the tube. Spurs formed at the inner periphery of those curved surfaces dig into the outer periphery of the first tube to retain it within the connector member. If an attempt is made to remove the first tube from the connector member, the sleeve moves with the first tube upwardly along the conically tapered bore of the connector member. The bore becomes smaller, constricting the sleeve radially inwardly against the tube. The entire sleeve surface eventually grips the tube, and provides a strong force preventing further outward movement of the first tube relative to the bore.

The outer periphery of the sleeve is preferably only approximately conical. Instead, at least the outer periphery of the first end portion is spaced radially inwardly from the conically tapered bore when the sleeve is in a relaxed position while an intermediate sleeve portion contacts the bore. This allows the first end to easily initially flex and receive the first tube.

In another feature of the present invention, the conical bore extends outwardly at an angle of approximately 12 degrees relative to a central axis of the bore, or an included angle of 24 degrees. The 12 degree angle provides a retainer assembly that is both easily assembled and also ensures a sure grip. A smaller angle may inadequately constrict the sleeve.

Other features relating to the connection of the various members are disclosed and form further features of this invention. These and the above-discussed features of the present invention can be best understood from the following specification and drawings, of which the following is a brief description.

BRIEF DESCRIPTION OF THE DRAWINGS

FIG. 1 is a view of a tube retainer assembly prior to assembly.

FIG. 2 is an assembled view of the assembly shown in FIG. 1.

FIG. 3 shows an attempt to remove a tube from the inventive assembly.

DETAILED DESCRIPTION OF A PREFERRED EMBODIMENT

Figure 4:
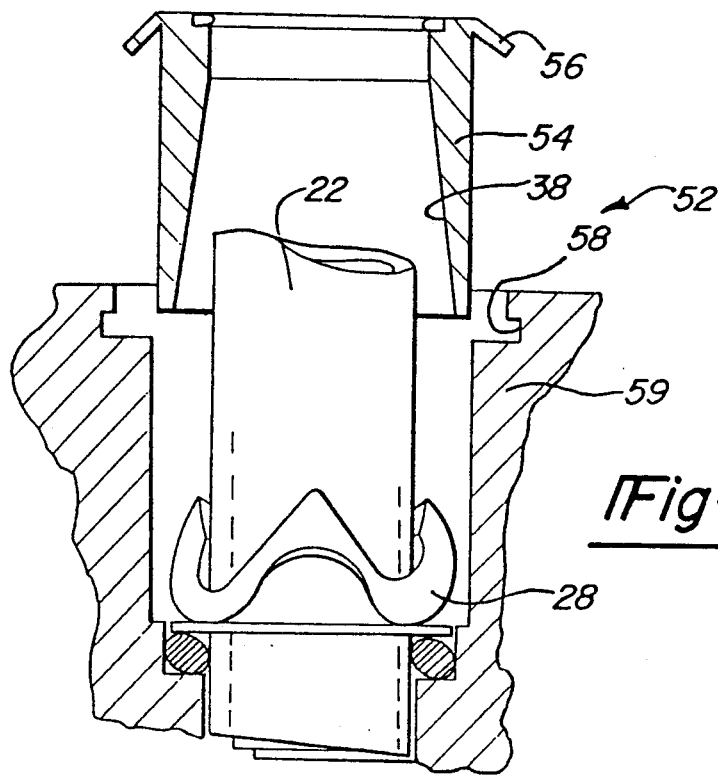
FIG. 4 is a view of an alternative embodiment prior to assembly.
Figure 5:
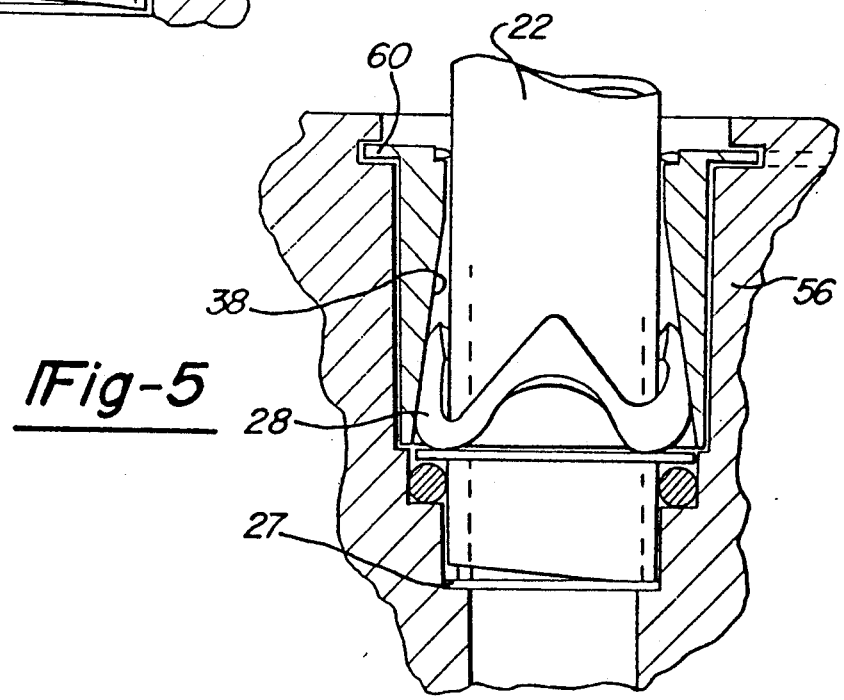
FIG. 5 is a view of the assembled embodiment illustrated in FIG. 4.

Tube retainer assembly 20 for connecting first tube 22 to second tube 24 is illustrated in FIG. 1. First tube 22 may be plastic, while second tube 24 may be metallic. Hollow fitting, or connector member 26, is connected to second tube 24 through a thread connection 25. Retaining sleeve 28 is received within fitting 26 to secure tube 22 within fitting 26. First tube 22 extends into a first end of fitting 26 and towards a second end, from which second tube 24 extends. Sleeve 28 comprises a plurality of curved surfaces 30 which face the second end of fitting 26 and alternating curved surfaces 32 which face the first end of fitting 26. The alternating curved surfaces 30 and 32 define the generally serpentine shape of sleeve 28, which is formed of an elastic material. Curved surfaces 30 are more adjacent the first end of fitting 26, while curved surfaces 32 are more adjacent the second end. Spurs 34 at the inner periphery of curved surfaces 30 initially grip tube 22. Ends 36 of sleeve 28 are connected by a thin flexible web 37. Ends 36 facilitates insertion of sleeve 28 into bore 38. Web 37 keeps ends 36 from tangling. Tube guide 27 will properly align tube 22 within fitting 26.

Hollow fitting 26 has a conically tapered internal bore 38 which extends radially outwardly about an axis from the first end, toward the second end. Sleeve 28, shown in a relaxed position, is received within bore 38 at a generally fixed axial position where the outer surface 40 of curved surfaces 30 is spaced inwardly from the inner periphery of bore 38. An intermediate portion 42 of sleeve 28 contacts bore 38 when sleeve 28 is in this relaxed position. Curved surfaces 30 define a non-continuous first end portion having an outer diameter which is less than the outer diameter defined at a non-continuous second end portion formed by curved surfaces 32. Thus, sleeve 28 has a approximately conical outer periphery, although curved surfaces 30 do extend inwardly at a greater angle than the remainder of sleeve 28, and thus the outer periphery of sleeve 28 is only approximately conical.

Bore 38 and sleeve 28 both extend outwardly an angles of approximately 12 degrees relative to a central axis of the bore. It has been found that 12 degrees is a particularly beneficial angle, and allows easy connection of tube 22 to sleeve 28, while providing sufficient constriction for a secure connection.

FIG. 2 illustrates the connection of tube 22 to tube 24. Tube 22 is forced into sleeve 28 such that its outer periphery forces spurs 34, and thus curved surfaces 30 radially outwardly. Since the outer surface 40 is normally spaced a small distance from the inner periphery of bore 38, it is initially easy to deform spurs 34 radially outwardly by the entry end of tube 22. This reduces the force necessary to insert first tube 22. Outer surface 40 of curved surfaces 30 eventually contacts the inner periphery of bore 38. Contact portions 42 continue to contact bore 38. Since sleeve 28 is elastic, it attempts to return to a relaxed position, such as shown in FIG. 1, and spurs 34 dig radially inwardly into the outer periphery of tube 22.

Spurs 34 define a surface extending along an angle that is nonparallel to the central axis of bore 38, and extends radially inwardly along a direction from the first end of fitting 26 towards the second end. Thus, the inner periphery defined by spurs 34 at the first end portion is generally conical, but expands inwardly rather than outwardly as does bore 38. The inner periphery of spurs 34 is preferably the radially innermost portion of sleeve 28. Thus, spurs 34 have an inner contact line 41 which will initially contact tube 22. Since its initial contact is over a line only, curved surfaces 30 move radially outwardly upon the application of a relatively small amount of initial force.

A boss on tube guide 27 is received within tube 22 to align and maintain a cylindrical shape for tube 22. This ensures that spurs 34 do not deform the inner periphery of tube 22. Tube 22 is forced into sleeve 28 until end 45 abuts stop 46 on guide 27. At this position sleeve 28 firmly grips and retains tube 22 within fitting 26. A lip seal 47 and an O-ring 48 are shown adjacent the outer periphery of tube 22 to seal the fluid connection between tubes 22 and 24. The seals also position sleeve 28.

As shown in FIG. 3, should an attempt be made to remove tube 22 from fitting 26, sleeve 28 remains on tube 22 and moves with tube 22 toward the first end of fitting 26 as shown at 50. As it moves, sleeve 28 is forced radially inwardly due to the constriction of bore 38. As one attempts to remove tube 22 from fitting 26, sleeve 28 digs further into tube 22 and further removal becomes difficult. The entire surface of sleeve 28 now contacts tube 22. Spurs 34 are deformed such that their entire surface contacts tube 22. Indent 51 is formed at the outer periphery of tube 22. The indent 51 is formed by the entire length of sleeve 28, and gripping pockets are formed below curved surfaces 30. The amount of movement of tube 22 to position 50, and the depth of indent 51 may be slightly exaggerated for the sake of illustration. To release tube 22 one preferably disconnects tube 24 from fitting 26.

FIG. 4 shows an alternative system 52 with fitting 54 having a flange 56 at a radially outer portion extending radially outwardly and towards the second end. Flange 56 is to be received within notch 58 in second tube 59.

When fitting 54 is forced into tube 59, tube 22 may already have been assembled and positioned on guide 27. Bore 38 forces portions of sleeve 28 radially inwardly to grip tube 22. As shown, flange 56 is deformed to deformed position 60 where it is generally planar and defines a surface generally perpendicular to the central axis of bore 38.

Although two particular methods of attaching the fitting to the second tube are disclosed, it should be understood that any type of connection between the two would come within the scope of this invention.

In one embodiment, sleeve 28 was formed of an elastomeric material, and in particular formed of a non-filled acetal copolymer, with a hardness grade of M80. One acceptable material is Celcon TM, available from Hoechst Celanese Corp. Preferably, it is injection molded. Other material may be used, including spring steel.

Preferred embodiments of the present invention have been disclosed, however, a worker of ordinary skill in the art would recognize that certain modifications would come within the scope of this invention. For that reason the following claims should be studied in order to determine the true scope and content of this invention.

I claim:

1. A system for connecting two generally elongate parts comprising:

a first part extending into a first end of a connector member which extends between said first end and a second end, a second part secured to said connector member, said connector member having a bore expanding conically outwardly about a central axis extending from said first end towards said second end;

a generally serpentine elastic sleeve received within said bore and contacting an outer periphery of said first part and an inner periphery of said bore, said sleeve having alternating curved surfaces facing said second end and said first end, said curved surfaces facing said second end defining a non-continuous first end portion and said curved surfaces facing said first end defining a non-continuous second end portion, said first end portion having an outer peripheral surface and an inner peripheral surface with diameters that are less than the diameters of an outer peripheral surface and an inner peripheral surface, respectively of said second end portion; and said outer periphery of said first end portion being axially aligned with a first portion of said conical bore intermediate said first and second ends, said bore having an inner diameter at said first portion which is greater than the outer diameter of said first end portion at a relaxed position such that said first end portion is spaced from said bore in said relaxed position, said first end portion inner diameter in said relaxed position being less than the outer diameter of said first part such that said first part deforms said first end portion radially outwardly from said relaxed position to a gripping position against the inner periphery of said bore.

2. The system recited in claim 1, wherein said first and second parts are hollow tubes.

3. The system recited in claim 1, wherein said bore of said connector member extends outwardly about an angle of approximately 12 degrees relative to said central axis.

4. The system recited in claim 1, wherein said curved surfaces facing said second end have spurs at an inner periphery defining a contact surface between said sleeve and said first part, said contact surface extending along an angle that is nonparallel to said central axis of said bore and moves radially inwardly along a direction from said first end towards said second end.

5. The system recited in claim 4, wherein a tube guide has an upstanding boss which receives and properly aligns an end of said first part adjacent said second end of said connector member.

6. The system recited in claim 5, wherein seals are disposed at an outer periphery of said first part adjacent said tube guide.

7. The system recited in claim 1, wherein said connector member is secured to said second part through a thread connection.

8. A system for connecting two generally elongate parts comprising:
a first part extending into a first end of a connector member which extends between said first end and a second end, a second part secured to said connector member, said connector member having a bore expanding conically outwardly about a central axis extending from said first end towards said second end;
a generally serpentine elastic sleeve received within said bore and contacting an outer periphery of said first part and an inner periphery of said bore, said sleeve having alternating curved surfaces facing said second end and said first end, said curved surfaces facing said second end defining a non-continuous first end portion and said curved surfaces facing said first end defining a non-continuous second end portion, said first end portion having an outer periphery with a diameter that is less than the diameter of an outer periphery of said second end portion;
said outer periphery of said first end portion being axially aligned with a first portion of said conical bore intermediate said first and second ends, said bore having an inner diameter at said first portion which is greater than the outer diameter of said first end portion at a relaxed position such that said first end portion is spaced from said bore in said relaxed position, said first end portion having an inner diameter in said relaxed position that is less than the outer diameter of said first part such that said first part deforms said first end portion radially outwardly from said relaxed position to a gripping position against the inner periphery of said bore; and
said connector member is secured to said second part by a flange formed at a radially outer portion of said connector member, said flange being formed angled radially outwardly and towards said second end from the remainder of said connector member, said second part having a circumferential notch at an inner periphery, said flange of said connector member being forced into said notch and deformed such that it lies in a plane generally perpendicular to said central axis to retain said connector member within said second part.

9. The system recited in claim 1, wherein said sleeve is formed of an elastomeric material.

10. A system for connecting two generally elongate parts comprising:
a first part extending into a first end of a connector member which extends between said first end and a second end, a second part secured to said connector member, said connector member having a bore expanding conically outwardly about a central axis extending from said first end towards said second end;
a generally serpentine elastic sleeve received within said bore and contacting an outer periphery of said first part and an inner periphery of said bore, said sleeve having alternating curved surfaces facing said second end and said first end, said curved surfaces facing said second end defining a non-continuous first end portion and said curved surfaces facing said first end defining a non-continuous second end portion, said first end portion having an outer periphery with a diameter that is less than the diameter of an outer periphery of said second end portion;
said outer periphery of said first end portion being axially aligned with a first portion of said conical bore intermediate said first and second ends, said bore having an inner diameter at said first portion which is greater than the outer diameter of said first end portion at a relaxed position such that said first end portion is spaced from said bore in said relaxed position, said first end portion having an inner diameter in said relaxed position that is less than the outer diameter of said first part such that said first part deforms said first end portion radially outwardly from said relaxed position to a gripping position against the inner periphery of said bore; and
said sleeve having a contact positon between said first and second end portions, said contact position being axially aligned with a second portion of said conical bore intermediate said first portion of said conical bore and said second end, said bore having an inner diameter at said second portion which is less than the outer diameter of said contact position such that said contact position is deformed against said second portion of said conical bore when said sleeve is in said relaxed position, said first and second end portions of said sleeve having outer peripheral surfaces spaced from said conical bore, such that said first and second end portions do not contact said conical bore in said relaxed position at positions spaced axially about said contact position.

11. The system recited in claim 1, wherein said sleeve is an elongate thin member having two ends.

* * * * *